(12) United States Patent
Babin

(10) Patent No.: US 6,588,442 B2
(45) Date of Patent: Jul. 8, 2003

(54) SERVO OPERATED ROTARY VALVE WITH EMERGENCY BYPASS AND METHOD OF MAKING SAME

(75) Inventor: Christopher J. Babin, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 6 days.

(21) Appl. No.: 09/974,994

(22) Filed: Oct. 11, 2001

(65) Prior Publication Data

US 2003/0070714 A1 Apr. 17, 2003

(51) Int. Cl.[7] ............................................. F16K 11/24
(52) U.S. Cl. .................. 137/1; 137/601.14; 137/601.15; 137/601.16
(58) Field of Search ........................ 137/601.14, 601.15, 137/601.16, 1, 599.05, 599.07

(56) References Cited

U.S. PATENT DOCUMENTS

| | | | | |
|---|---|---|---|---|
| 1,978,737 A | * | 10/1934 | Bower et al. | 137/601.14 |
| 3,038,449 A | * | 6/1962 | Murphy et al. | 137/599.07 |
| 3,400,736 A | | 9/1968 | Bastle | 137/625.29 |
| 4,877,056 A | * | 10/1989 | Comte et al. | 137/599.07 |
| 5,085,401 A | * | 2/1992 | Botting et al. | 251/129.11 |
| 5,967,185 A | | 10/1999 | Baruschke | 137/625.29 |
| 6,302,146 B1 | * | 10/2001 | McHugh | 137/601.16 |

* cited by examiner

Primary Examiner—S Hepperle
(74) Attorney, Agent, or Firm—Roger A. Johnston

(57) ABSTRACT

A motorized rotary water valve has an integrally formed one piece motor housing and emergency bypass channel. A solenoid operated valve is integrally provided on the bypass channel and is spring biased to the open position upon shut off of electrical power to the solenoid.

10 Claims, 3 Drawing Sheets

US 6,588,442 B2

1

SERVO OPERATED ROTARY VALVE WITH EMERGENCY BYPASS AND METHOD OF MAKING SAME

BACKGROUND OF THE INVENTION

The present invention relates to servo motor operated rotary valves and particularly valves of the type intended for use in controlling flow of fluid in an engine coolant circuit, as for example, valves employed for controlling flow of engine coolant to a cabin heat exchanger or heater core or for controlling flow of coolant to the engine block cooling passages.

Servo motor operated heater core water valves and servo motor operated temperature control valves for engine coolant are desirable inasmuch as an electronic controller may be employed to provide direct control of the fluid flow in real time response to transient conditions in place of static setting of the valve or having the valve only able to respond to changes in the fluid temperature utilizing a temperature responsive valve. However, where an electrically operated servo motor actuator is employed to control cabin heater core water flow or flow of coolant between the engine and the ambient coolant heat exchanger or radiator, provision must be made for the fluid flow to continue in the event of electrical failure or mechanical failure of the servo actuator. This is particularly true for flow of engine coolant to the cabin heater core where the vehicle is being operated in cold climatic conditions in order to ensure survival of the vehicle occupants.

Presently, in production motor vehicles; a rotary type water valve for the heater core has been found to be much superior to a butterfly type water valve for providing accurate modulation of the flow to the heater core or in the regulation of coolant within the engine for purposes of optimizing fuel economy and emissions. However, modulating rotary water valves for the vehicle cabin heater core require a low cost servo actuator which has a minimum volume to facilitate installation of the motorized valve in the vehicle temperature control system which is commonly mounted on the cabin front bulkhead or firewall of the engine compartment. In order to provide a reduced size and low cost actuator, a small subfractional horsepower high RPM motor has been employed through a speed reducer or a gear box to drive the rotary valve. However, in the event of failure of the motorized drive or loss of electrical power in such an arrangement with the valve in the closed position, the result is loss of heat to the cabin heat exchanger and an unacceptable risk or threat to the survival of the occupants of the vehicle in cold climate operation and potential loss of coolant flow to the engine.

Therefore, it has been desired to provide a way or means of providing emergency flow of engine coolant in the event of failure of the rotary water valve controlling flow to either the cabin heater or to the engine coolant heat exchanger or radiator in the event of failure of the electrically operated modulating water valve in the closed portions.

BRIEF SUMMARY OF THE INVENTION

The present invention provides a servo motor operated modulating rotary valve assembly, particularly suitable for controlling flow of engine coolant to a heater core or radiator and has a servo motor and speed reducer attached integrally therewith. The valve assembly further has an integrally formed bypass which is operated by an integral electrical actuator, preferably a solenoid, which is spring biased to the normally open condition when the solenoid is de-energized. The present invention thus provides a servo motor driven modulating rotary valve with an integral bypass that is electrically closed upon system start-up and can either be opened on command or in the event of system electrical power failure. Thus, the integral motorized rotary valve of the present invention provides for emergency bypass in the event of malfunction of the rotary valve actuator or power failure with the rotary valve in the closed condition.

DETAILED DESCRIPTION OF THE INVENTION

Figure 1:
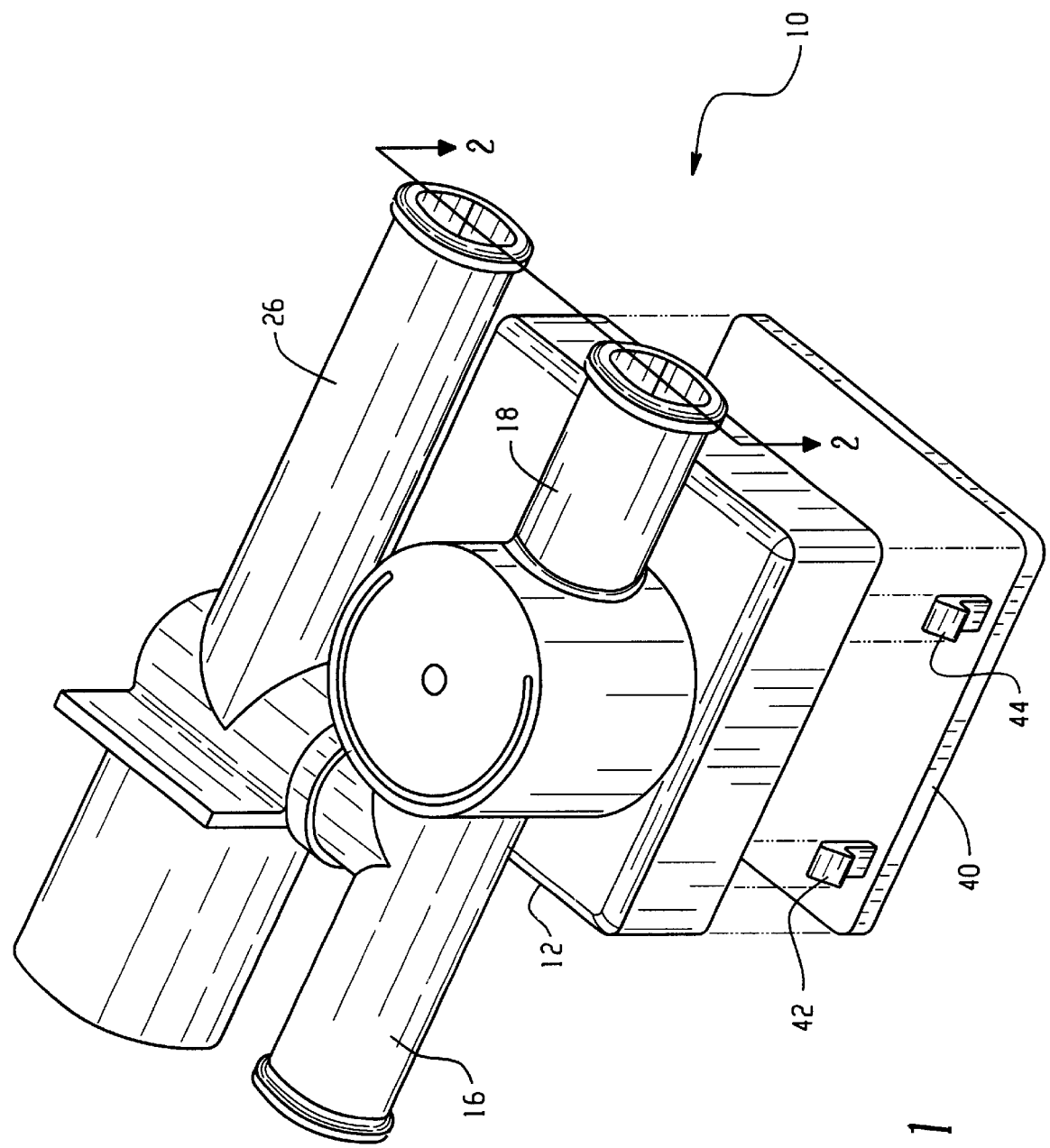
FIG. 1 is a perspective view of the assembly of the rotary valve, actuator housing and emergency bypass actuator.
Figure 2:
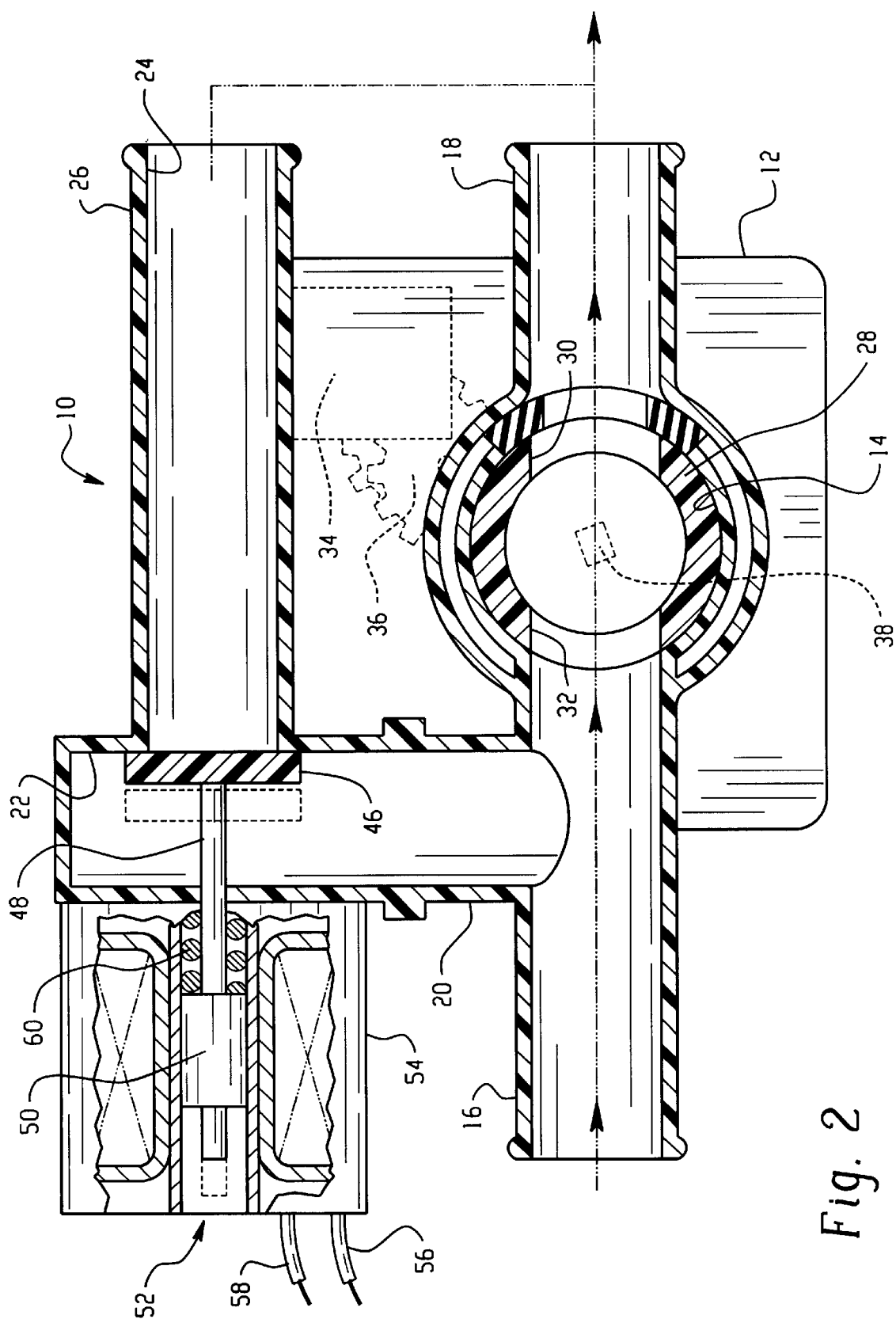
FIG. 2 is a cross section taken along section indicating lines 2—2 of FIG. 1 showing the bypass valve in the closed condition.

Referring to FIGS. 1 and 2, the valve assembly of the present invention is indicated generally at 10 and includes a one piece valve body and actuator housing 12 formed preferably integrally as one piece with a valving chamber 14, inlet fitting 16, outlet fitting 18, and bypass channel 20 defining a bypass valving chamber 22 which communicates with a bypass outlet passage 24 formed in fitting 26. It will be understood that bypass outlet passage 24 is adapted to externally connected in the system to the outlet 18 as indicated by the dashed outlines in FIG. 2.

Valving chamber 14 has disposed therein a rotary valve member 28 which has cross ports 30, 32 formed therein for permitting flow between the inlet 16 and outlet 18 when the rotary valve 28 is oriented in the position shown in FIG. 2. The housing 12 has mounted on the underside thereof a servo motor 34 and speed reducer 36, as shown in dashed outline in FIG. 2, which are operatively connected to the rotary valve member by driving engagement with the hub of the valve member denoted by reference numeral 38 and shown in dashed outline in FIG. 2. The housing with the servo motor and speed reducer therein may be closed by a suitable cover member 40 and retained thereon by suitable snap locking engagement as for example by the barbed lugs 42, 44 engaging recess or detents formed on the interwall of the housing in a manner well known in the art.

A bypass valve obturator 46 is movably disposed in the bypass chamber 22 and is shown in the closed position in solid outline in FIG. 2 and in open position in dashed outline in FIG. 2. The obturator 46 is connected to an operating rod 48 which in turn is operatively connected to an armature 50 of a solenoid actuator indicated generally at 52 which is attached to the bypass channel 20 and covered by a casing 54 with electrical leads 56, 58 extending externally thereof for providing electrical energization of the solenoid 52. A return spring 60 is provided within the solenoid and biases armature 50 in a direction to move the obturator 46 to the open position when the valve solenoid is de-energized.

In operation, solenoid actuator 52 is energized upon system start up and obturator 46 is moved to the closed position such that flow is controlled exclusively by rotary valve member 28. When power to actuator 52 is cut off, obturator 46 is moved to the open position by the force of spring 60 providing bypass flow through outlet passage 24.

Figure 3:
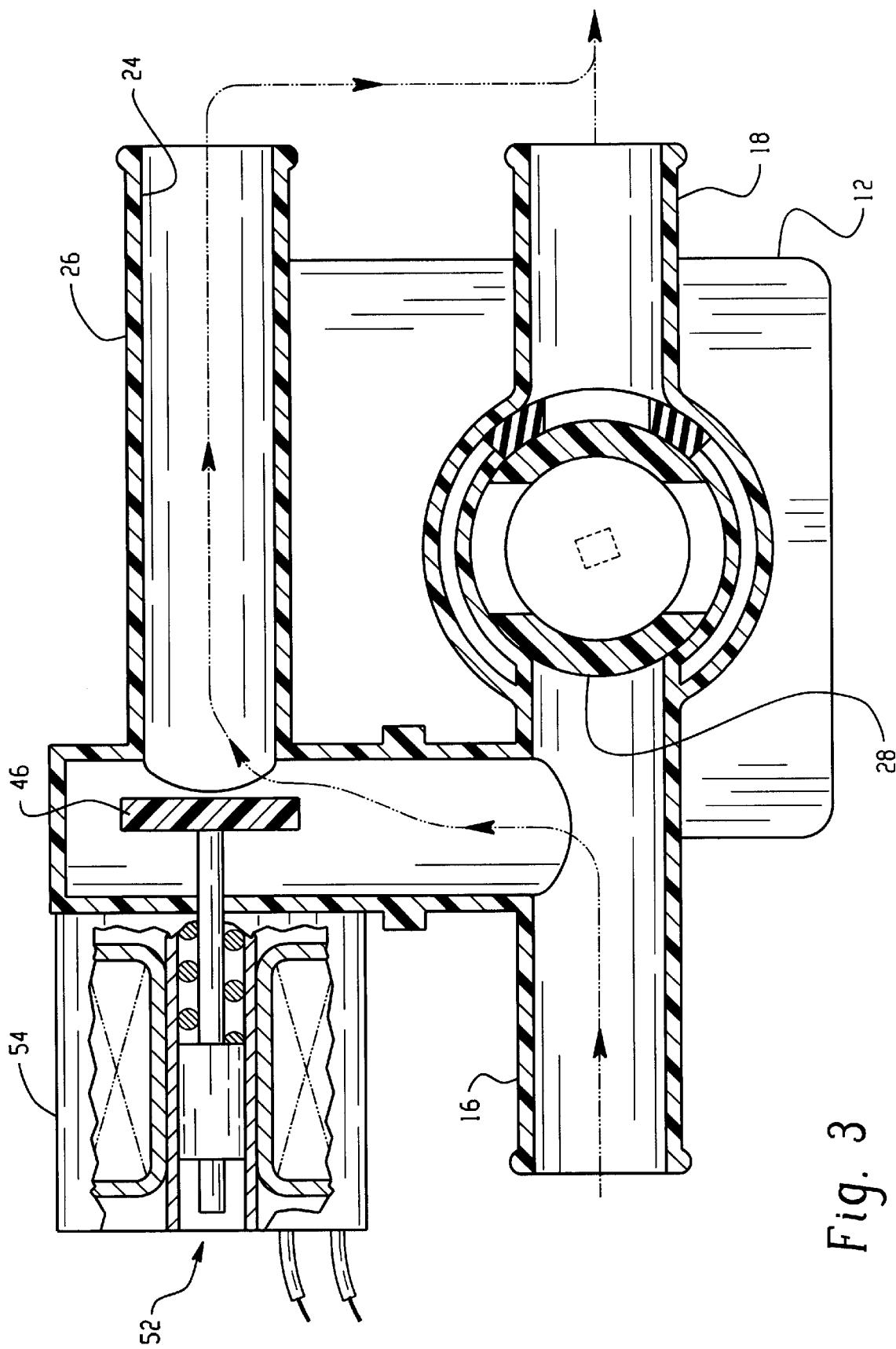
FIG. 3 is a view similar to FIG. 2 showing the bypass valve in the open position with the rotary valve closed.

Referring to FIG. 3, the rotary valve member 28 is shown in the closed position; and, the bypass valve 46 opened by spring 60, with actuator 52 de-energized.

The present invention thus provides a motorized rotary valve with an integrally formed bypass having a solenoid operated valve therein which is normally open but closed by an electrical actuator upon system power up. The bypass valve is biased to the open position upon system power failure and thus provides emergency bypass of the rotary valve.

Although the invention has hereinabove been described with respect to the illustrated embodiments, it will be understood that the invention is capable of modification and variation and is limited only by the following claims.

What is claimed is:

1. A servo actuated rotary valve assembly with emergency bypass comprising:
   (a) a valve body defining a valving chamber having an inlet, outlet and a bypass channel communicating with the inlet;
   (b) a rotary valve member disposed in the valving chamber and rotatable between a position blocking and at least one position permitting flow between the inlet and outlet;
   (c) a servo motor disposed with the body and operatively connected for, upon energization, effecting said movement of the rotary valve member; and,
   (d) an obturator moveably disposed in said bypass channel and moveable therein between a normally open position permitting, and a closed position preventing flow through the bypass channel; and,
   (e) an electrical actuator operably connected to the bypass valve member and operable upon energization to move the bypass valve member to the closed position.

2. The valve assembly defined in claim 1, wherein said rotary valve member has a cylindrical configuration with a cross port therein.

3. The valve assembly defined in claim 1, wherein said electric actuator includes a solenoid having an armature connected to the obturator.

4. The valve assembly defined in claim 1, wherein said electric actuator includes a solenoid having an armature operatively connected to the obturator and a spring biasing the obturator to the open position.

5. The valve assembly defined in claim 1, wherein said body has an inlet fitting, an outlet fitting and has the bypass channel and valving chamber formed integrally therewith as a one piece member.

6. The valve assembly defined in claim 1, wherein said body has said valving chamber, said inlet, said outlet, said bypass channel and a housing for the servo motor formed integrally as a one piece member.

7. The valve assembly defined in claim 1, wherein said one piece member is formed of plastic material.

8. A method of making a servomotor operated rotary valve with an emergency bypass comprising:
   (a) forming a valving chamber and forming an inlet and outlet communicating therewith in a body and disposing a valve member for rotary movement in the chamber;
   (b) forming a channel communicating the inlet with the outlet and bypassing said valving chamber;
   (c) forming a valve seat in the channel and disposing a normally open obturator therein and opening and closing the obturator against the valve seat;
   (d) disposing an electrically operated actuator with the body and connecting the actuator to the obturator; and,
   (e) disposing a servo motor with said body and connecting the servomotor to the valve member and effecting the rotary movement thereof.

9. The method defined in claim 8, wherein said step of forming a valving chamber, inlet and outlet and forming a channel include molding a one-piece member.

10. The method defined in claim 8, wherein said step of disposing an electrically operated actuator and connecting to the obturator includes disposing a solenoid on said body and connecting the armature thereof to the obturator.

* * * * *